UNITED STATES PATENT OFFICE.

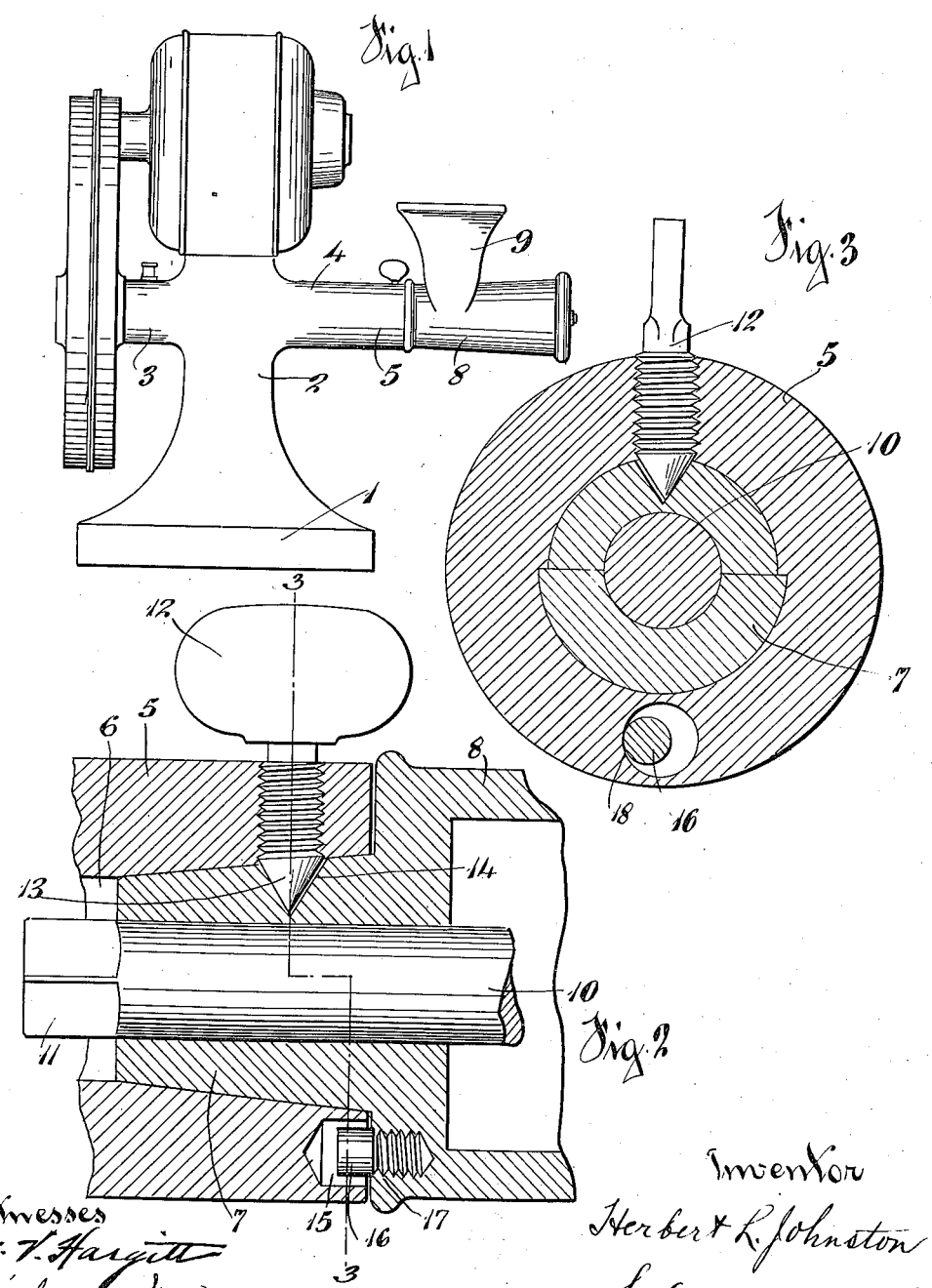

HERBERT L. JOHNSTON, OF TROY, OHIO, ASSIGNOR TO THE HOBART MANUFACTURING COMPANY, OF TROY, OHIO, A CORPORATION OF OHIO.

COUPLING DEVICE.

1,191,313.      Specification of Letters Patent.      Patented July 18, 1916.

Application filed June 19, 1913. Serial No. 774,567.

*To all whom it may concern:*

Be it known that I, HERBERT L. JOHNSTON, a citizen of the United States, and a resident of the city of Troy, in the county of Miami and State of Ohio, have invented certain new and useful Improvements in Coupling Devices, of which the following is a full, clear, and exact description, reference being had to the accompanying drawing, forming part of this specification.

The object is to provide connecting devices for such machines or attachments as meat choppers, coffee mills, bone grinders, vegetable slicers, grindstones, spice grinders and the like, with the basic unit forming the support and casing for the source of the power for driving the attachments, in order that the attachments may be readily and easily coupled to or disengaged from the base portion, and in which the strain incident to the rotation of the driving mechanism may be removed from the engaging and locking devices.

It has been customary to provide means of various kinds for driving such machinery as coffee mills, grinders and the like, and whether the motor power is gas, water or electricity, the motor has been provided with a casing and base for a support, and the grinding or other machine to be driven has been attached directly or through intermediate gearing to the driving shaft of the motor. The motor is designed to be used for a number of different machines or attachments as a unitary structure. The base of the motor, therefore, becomes a unitary base for the various attachments.

The purpose of my present invention is to arrange for the ready and easy attachment and detachment of the machine so that it may be firmly and securely attached and the strain removed from the attaching devices.

I have illustrated in the drawings a meat chopper as attached to an electric motor construction, but it should be understood that the invention is directed to the means of making the attachment. The kind of motor and the character of the attaching machine is not material.

In the drawings, Figure 1 is a side elevation illustrating my improved construction. Fig. 2 is a longitudinal section through the coupling device. Fig. 3 is a transverse section taken on the broken lines 3—3 of Fig. 2 with the thumb screw in elevation.

In the present illustration, 1 is the base and 2 the supporting standard of an electric motor, the driving shaft of which is mounted in side bearings 3, 4, and one of these side bearings is extended to form a projecting arm 5. The outer end of this arm is provided with a conical socket 6, to receive the cone-shaped projection 7 from the casing 8 of the machine to be attached, in the present instance, a meat chopper. In this casing 8 is rotatably mounted the meat chopping mechanism, and 9 is the hopper through which the material to be treated is fed. The driving shaft 10 is shaped at its outer end 11 to provide a locked engagement with the driving shaft of the motor.

The socket 6 in the projection 5 is tapered with the larger end of the taper outward, and the projection 7 from the attachment is correspondingly tapered to fit into the socket.

For the projecting arm 5 a thumb screw 12 is provided, the screw threads of which engage a suitable threaded opening through the arm into the socket. This thumb screw is formed with a cone-shaped point 13, adapted to engage a corresponding cone-shaped recess 14 in the portion 7. This recess, when the parts are inserted, does not register, however, with the cone-shaped point 13 of the thumb screw, but is formed somewhat nearer the machine attachment than it would be for perfect registration. The result of this is that when the thumb screw is screwed downward, the cone-shaped end 13 impinges on the outer side of the socket 14 and the attachment is drawn tightly into place.

In the lower outer face of the projecting arm 5 of the motor casing, a socket 15 is formed to receive the projecting end of the stud 16 which is mounted in the outer face of the annular shoulder 17 on the machine casing, which butts up against the end of the projecting arm 5. This socket 15 is of somewhat larger diameter than the diameter of the stud 16, so that there is a loose fit. As the shaft 10 is rotated by the motor, there is of course a tendency of the entire attachment casing to rotate and this brings the stud 16 to bear upon the side of the socket 15, as shown at 18 in Fig. 3. This structure, therefore, takes the entire strain of the tendency to rotate off of the thumb screw 12, and the stud 16 carries this strain.

Inasmuch as the stud 16 is of less diameter than the socket 15, not only is the above result accomplished, but when it is desired to remove the attachment, the thumbscrew is withdrawn and a slight tap on the housing permits the two parts to be instantly separated. If the stud 16 fitted in a tight socket, the only way to separate the housings would be by a direct pull in line with the axle of the shaft, and very frequently the parts would stick. Where we have the stud 16 in a loose socket, the frictional contact of the two housings can be broken by a very slight tap on one of the parts.

The problem presented is to provide a set screw for drawing and locking the shaft carrying housings in proper alinement and at the same time to provide a construction that shall be quick detachable. For this we have the tapered bearings for the housings with the conical set screw adjustment and a stud fitting in a loose socket so that the rotation of the shaft acting on the housings shall cause the stud to take all the rotary strain, and at the same time there shall be no tendency for the parts to lock fast.

Having thus described my invention, what I claim as new and desire to secure by Letters Patent, is:—

In a coupling device, the combination with two shaft housings fitting one within the other and having tapered connection therebetween, of means for coupling the housings together comprising a set screw with a conical end mounted in the outer housing, the inner housing being provided with a conical socket adapted to receive the set screw, said socket being slightly out of alinement with the conical end of the set screw, and means for preventing rotation of the housings, said means at the same time removing the rotary strain from the coupling means and comprising a stud projecting from one housing member, the other housing member being provided with a socket to receive the stud, said socket being of larger diameter than the stud.

HERBERT L. JOHNSTON.

Attest:
 IRVIN AGNA,
 A. W. DENDEESE.